US010982861B2

(12) United States Patent
Gu et al.

(10) Patent No.: US 10,982,861 B2
(45) Date of Patent: Apr. 20, 2021

(54) MODELING METHOD OF COMBINED HEAT AND POWER OPTIMAL DISPATCHING MODEL

(71) Applicant: SOUTHEAST UNIVERSITY, Nanjing (CN)

(72) Inventors: Wei Gu, Nanjing (CN); Chenyu Wu, Nanjing (CN); Zhi Wu, Nanjing (CN); Suyang Zhou, Nanjing (CN); Ping Jiang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 375 days.

(21) Appl. No.: 16/107,958

(22) Filed: Aug. 21, 2018

(65) Prior Publication Data

US 2018/0356105 A1    Dec. 13, 2018

Related U.S. Application Data

(63) Continuation-in-part of application No. PCT/CN2018/074413, filed on Jan. 29, 2018.

(30) Foreign Application Priority Data

Apr. 28, 2017   (CN) .......................... 201710296092.6

(51) Int. Cl.
    *F24D 19/10*   (2006.01)
    *F24D 3/02*    (2006.01)
    (Continued)

(52) U.S. Cl.
    CPC ........... *F24D 19/1048* (2013.01); *F24D 3/02* (2013.01); *F24D 3/1075* (2013.01); *F24D 12/02* (2013.01);
    (Continued)

(58) Field of Classification Search
    CPC ...... F24D 19/1048; F24D 3/02; F24D 3/1075; F24D 12/02; F24D 13/00; F24D 2200/08;
    (Continued)

(56) References Cited

U.S. PATENT DOCUMENTS

2015/0134120 A1 *   5/2015   Sun ...................... G05B 13/021
                                                          700/276
2018/0356774 A1 *  12/2018   Wu ...................... F24D 19/1048

FOREIGN PATENT DOCUMENTS

CN         105807633 A   *   7/2016

OTHER PUBLICATIONS

Bhatia, A. (2013), Heat Loss Calculations and Principles. Decatur Professional Development. (Year: 2013).*
(Continued)

*Primary Examiner* — Omar F Fernandez Rivas
*Assistant Examiner* — Pursottam Giri
(74) *Attorney, Agent, or Firm* — CBM Patent Consulting, LLC (57) ABSTRACT

A CHP optimal dispatching model is a mixed integer programming model and is used for a district heating system (DHS) comprising a heat source, a heating network and a heat load, and the heating network comprises a heat transmission network and a heat distribution network. A plurality of heating areas is divided, and one day is divided into a plurality of time periods; the heat transmission loss of the heat distribution network is omitted, and a heat transmission network model taking transmission time delay of the heating network into consideration is established according to the heat transmission network; a terminal heat consumer model capable of reflecting indoor temperature is established; and a combined optimal dispatching model comprising conventional generators, wind power units, CHP units, electric boilers and heat storage tanks is established.

4 Claims, 3 Drawing Sheets

(51) Int. Cl.

| | |
|---|---|
| *F24D 3/10* | (2006.01) |
| *G05B 17/02* | (2006.01) |
| *F24D 12/02* | (2006.01) |
| *H02J 3/46* | (2006.01) |
| *F24D 13/00* | (2006.01) |

(52) U.S. Cl.
CPC ............ *F24D 13/00* (2013.01); *G05B 17/02* (2013.01); *H02J 3/46* (2013.01); *F24D 2200/08* (2013.01); *F24D 2200/15* (2013.01); *F24D 2200/32* (2013.01); *H02J 2203/20* (2020.01)

(58) Field of Classification Search
CPC . F24D 2200/15; F24D 2200/32; G05B 17/02; H02J 2203/20
See application file for complete search history.

(56) References Cited

OTHER PUBLICATIONS

Z. Li, W. Wu, M. Shahidehpour, J. Wang and B. Zhang, "Combined Heat and Power Dispatch Considering Pipeline Energy Storage of District Heating Network," in IEEE Transactions on Sustainable Energy, vol. 7, No. 1, pp. 12-22, Jan. 2016, doi: 10.1109/TSTE.2015.2467383 (Year: 2015).*

Pengfei Jie, Zhe Tian, Shanshan Yuan, Neng Zhu,"Modeling the dynamic characteristics of a district heating network, Energy" vol. 39, Issue 1, 2012 (Year: 2012).*

Jinghua Li, Jiakun Fang, Qing Zeng, Zhe Chen,"Optimal operation of the integrated electrical and heating systems to accommodate the intermittent renewable sources" College of Electrical Engineering, Guangxi University, Nanning 530004, China 2015 (Year: 2015).*

\* cited by examiner

MODELING METHOD OF COMBINED HEAT AND POWER OPTIMAL DISPATCHING MODEL

This application is the continuation-in-part of International Application No. PCT/CN2018/074413 filed on 29 Jan. 2018 which designated the U.S. and claims priority to Chinese Application No. CN201710296092.6 filed on 28 Apr. 2017, the entire contents of each of which are hereby incorporated by reference.

TECHNICAL FIELD

The present invention relates to the field of combined economic dispatch of power systems and heat systems and in particular relates to a modeling method of a combined heat and power (CHP) optimal dispatching model.

BACKGROUND ART

Wind energy is a renewable energy source with the highest large-scale commercial development potential in the current world. The wind energy is developed and utilized on a large scale to generate power, which has become effective measures for solving energy and environment problems, improving the energy structure and guaranteeing the sustainable development of national economy in various countries in the world. Jilin province has abundant reserves of renewable energy, and has the conditions to build a national clean energy base. Wherein the installed capacity of wind power can be 54 million kilowatts, and therefore, Jilin province is one of nine ten-million-kilowatts wind power bases determined by the nation.

The Three-Northern areas in China are abundant in wind energy resources, but are unreasonable in energy structures, for example, the heat and power conflict in Jilin province is abnormally prominent. The installed capacity of CHP units in the whole province reaches 13.1484 billion kilowatts which accounts for 74% of that of coal-fired power capacity, is 8 billion kilowatts larger than the minimum load regulated by the whole province and is 4 billion kilowatts larger than the regulated maximum load. After entering the heating period, the peak adjustment of power grid difficulty is extremely high even if all the CHP units operate under the minimum mode, and wind power is forced to take part in peak regulation when the load is low at night. In an extreme low-load period such as the Spring Festival, all wind generation units and pure condensing units have to stop, more than 3 billion kilowatts of power cannot be absorbed, and therefore, the safety of the power grid can be guaranteed only if emergency measures are adopted and the support from interconnecting lines of northeast power grids is obtained. As a result, the problem of abandoning wind power in Jilin province is very serious, Jilin province continuously ranks the top of China in the aspect of the wind abandoning rate in recent years, large-area abandoned wind in the medium period of heating and all wind turbines stop at night have become a normal state, and the accumulative wind abandoning rate reaches 31.1%.

SUMMARY OF THE INVENTION

Purpose of invention: the present invention provides a modeling method of a CHP optimal dispatching model in order to solve problems existing in the prior art, realize ultrashort-term CHP urgent dispatching and promote the absorption of wind power.

Technical solution: the modeling method of the CHP optimal dispatching model is provided, the CHP optimal dispatching model is a mixed integer programming model and is used for a district heating system (DHS) comprising heat sources, heating networks and heat loads, the heating networks comprise heat transmission networks and heat distribution networks, and the modeling method comprises the following steps:

step 1: dividing a plurality of heating areas according to the distance between the heat load and the heat source, and dividing the day into a plurality of time periods;

step 2: omitting the heat transmission loss of the heat distribution network, and establishing a heat transmission network model taking transmission time delay of the heating network into consideration according to the heat transmission network;

step 3: establishing a terminal heat consumer model that can reflect indoor temperature according to the heat load; and step 4: establishing a combined optimal dispatching model comprising conventional generators, wind power units, CHP units, electric boilers and heat storage tanks according to the heat source.

Beneficial effects: compared with the prior art, the modeling method has the following advantages:

(1) the consideration of the transmission time of hot water in a heating pipe network is taken into optimal dispatch, so that the dispatching model is closer to the actual condition, the time delay characteristic of the heating pipe network is embodied, and the peak staggered regulation of heat supply and power supply can be realized by utilizing the characteristic;

(2) the heat load node is no longer regarded as a simple load node, but a heat load whose demand is calculated based on the environmental temperature. The indoor temperature is kept by sufficiently utilizing the thermal inertia of the building and the heat load node is also involved in the peak staggered regulation of heat supply and power supply; and (3) the heating network model and power grid load flow constraints established by using the method are substantially linear, the whole optimal model is mixed integer programming, and most of existing optimal software can rapidly solve this problem. This model provides important guarantee for the safe and stable operation of the system. The combustion of fossil fuel can be reduced, the wind power absorption capacity of the system is improved, and therefore, the modeling method has certain social and economic benefits.

DETAILED DESCRIPTION OF THE INVENTION

The present invention is further described below in combination with accompanying drawings and specific embodiments.

Figure 1:
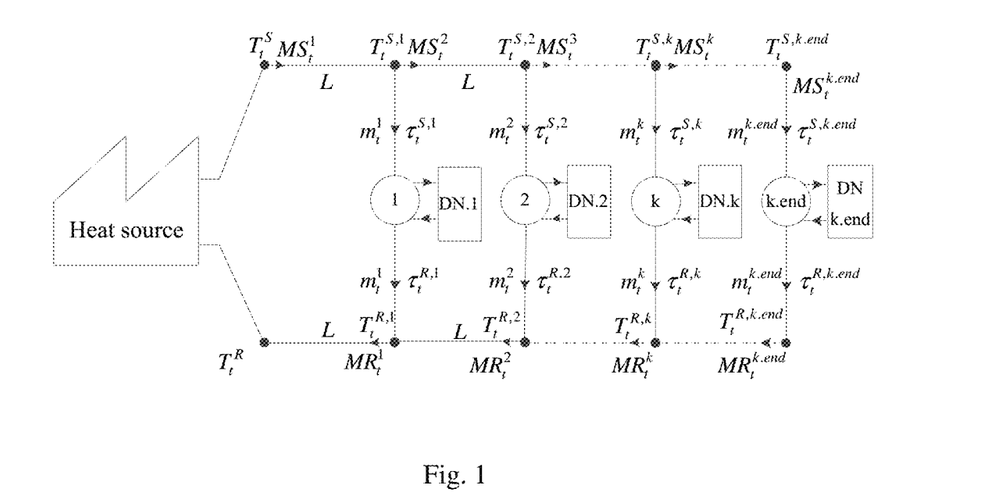
FIG. 1 is a structure diagram of the heat transmission network.

A modeling method of a CHP optimal dispatching model is characterized in that the CHP optimal dispatching model is a mixed integer programming model and is used for the district heating system (DHS) comprising heat sources, heating networks and heat loads, the heating network comprises heat transmission network (primary heating network) and heat distribution network (secondary heating network), the primary heating network is shown as FIG. 1, the circle represents for a heat-exchange station, the rectangle represents for the secondary heating network. The modeling method comprises the following steps:

Step 1: a plurality of heating areas is divided according to the distance between the heat load and the heat source, and the day is divided into a plurality of time periods.

Step 2: the heat transmission loss of the heat distribution network is omitted, and a heat transmission network model taking transmission time delay of the heating network into consideration is established according to the heat transmission network.

The transmission speed of hot water in the heat transmission network is taken into consideration, the heat loss in each heating area within each time period is calculated respectively, and a confluence node model of the heat transmission network is established, so that a steady state heat transmission model of the whole heat transmission network is described.

Firstly, unit pipeline length is calculated according to the velocity of water flow and dispatching time interval, see a formula (1):

$$L = v \cdot \Delta t \quad (1)$$

wherein L is the unit pipeline length, v is the velocity of the water flow, and $\Delta t$ is the dispatching time interval;

(1) the thermal resistance $R_e$ of soil can be calculated by using a formula (2) according to a basic theory of heat transfer. After the thermal resistance value of the soil is obtained, the temperature loss of hot water in a pipeline within a certain length can be calculated according to formulae (3) and (4):

$$R_e = \frac{1}{2\pi\lambda_e} \ln\left( \frac{2(h+\lambda_e/a_r)}{d_{ex}} + \sqrt{\left(\frac{2(h+\lambda_e/a_r)}{d_{ex}}\right)^2 - 1} \right) \quad t \in \Gamma \quad (2)$$

$$\Delta T_t^{S,k} = \frac{(1+\beta)L}{c_{water} MS_t^k} \cdot \frac{(T_t^{S,k} - T_t^{surf}) \cdot 2\pi\lambda_b}{\ln(d_{ex}/d_{in}) + 2\pi\lambda_b R_e} \quad \forall t \in \Gamma, k \in K \quad (3)$$

$$\Delta T_t^{R,k} = \frac{(1+\beta)L}{c_{water} MR_t^k} \cdot \frac{(T_t^{R,k} - T_t^{surf}) \cdot 2\pi\lambda_b}{\ln(d_{ex}/d_{in}) + 2\pi\lambda_b R_e} \quad \forall t \in \Gamma, k \in K \quad (4)$$

wherein $R_e$ is the thermal resistance of the soil, $\Delta T_t^{S,k}$ represents for the temperature loss of a water supply network in the $k^{th}$ heating area within the $t^{th}$ time period, $\Delta T_t^{R,k}$ represents for the temperature loss of a water return network in the $k^{th}$ heating area within the $t^{th}$ time period, h represents for the distance between the center of a heating pipeline and a soil surface, $\lambda_e$ represents for the soil thermal conductivity coefficient, $\alpha_r$ represents for the heat transmission coefficient of the soil surface, $d_{in}$ and $d_{ex}$ respectively represent for the internal and external diameters of the pipeline, $\beta$ represents for an additional factor of heat loss caused by appendixs, $\lambda_b$ represents for the thermal conductivity of an insulation material on the surface of the pipeline, $c_{water}$ represents for the specific heat capacity of water, $T_t^{surf}$ represents for the temperature of the soil surface at period t, $MS_t^k$ and $MR_t^k$ respectively represent for mass flow rates of hot water in a water supply pipeline and a water return pipeline in the $k^{th}$ heating area at period t, $T_t^{S,k}$ and $T_t^{R,k}$ respectively represent for water temperatures of the water supply pipeline and a water return pipe network in an area K at period t, $\Gamma$ represents for a set of dispatching periods, and K represents for a set of heating areas of heat loads;

(2) continuity constraints of mass flow rates of nodes considering time delay:

$$\begin{cases} MS_t^k = m_{t+1}^k + MS_{t+1}^{k+1} \\ MS_t^{k \cdot end} = m_t^{k \cdot end} \end{cases} \forall k, k+1 \in K, t \in \Gamma \quad (5)$$

$$\begin{cases} MR_t^k = m_t^k + MR_{t-1}^{k+1} \\ MR_t^{k \cdot end} = m_t^{k \cdot end} \end{cases} \forall k, k+1 \in K, t \in \Gamma \quad (6)$$

wherein k.end represents for the last heating area, and $m_t^k$ represents for the mass flow rate of hot water flowing through the $k^{th}$ heat-exchange station;

(3) water temperature at a confluence node:

$$MR_{t+1}^k = T_{t+1}^{R,k} = m_t^k \tau_{t+1}^{R,k} + MR_t^{k+1} (T_t^{R,k+1} - \Delta T_t^{R,k+1}) \\ \forall k \in K, t \in \Gamma \quad (7)$$

wherein $\tau_{t+1}^{S,k}$ and $\tau_{t+1}^{R,k}$ respectively represent for the water supply temperature and the water return temperature of the $k^{th}$ heat-exchange station at period t;

(4) temperature loss of hot water in pipelines in the adjacent heating areas:

$$\begin{cases} T_{t+1}^{S,1} = T_t^S - \Delta T_t^{S,1} \\ T_{t+1}^{S,k+1} = T_t^{S,k} - \Delta T_t^{S,k} \\ T_{t+1}^R = T_t^{R,k} - \Delta T_t^{R,k} \\ T_t^{S,k} = \tau_t^{S,k} \end{cases} \forall k \in K, t \in \Gamma \quad (8)$$

(5) pipeline flow rate limitation:

$$0 \leq m_t^k \leq \overline{m}^k \quad \forall k \in K, t \in \Gamma \quad (9)$$

$$0 \leq MS_t^k \leq \overline{MS}^k \quad \forall k \in K, t \in \Gamma \quad (10)$$

$$0 \leq MR_t^k \leq \overline{MR}^k \quad \forall k \in K, t \in \Gamma \quad (11)$$

wherein $\overline{m}^k$ represents for the maximum mass flow rate flowing through the $k^{th}$ heat-exchange station, and $\overline{MS}^k$ and $\overline{MR}^k$ respectively represent for the maximum mass flow rates of the $k^{th}$ water supply pipeline and the $k^{th}$ water return pipeline;

(6) pressure loss:

$$PS_t^k - PS_t^{k+1} = \frac{\mu \cdot f_k \cdot (MS_t^k)^2}{(d_{in}^k)^5 (\rho_t^k)^2} \quad \forall k \in K, t \in \Gamma \quad (12)$$

$$PR_t^{k+1} - PR_t^k = \frac{\mu \cdot f_k \cdot (MR_t^k)^2}{(d_{in}^k)^5 (\rho_t^k)^2} \quad \forall k \in K, t \in \Gamma \quad (13)$$

$PS_t^k$ and $PR_t^k$ respectively represent for pressures of the water supply pipeline and the water return pipeline in the $k^{th}$ area at period t, $\mu$ represents for a pressure coefficient of the pipeline, $f_k$ represents for a friction coefficient in the $k^{th}$ heating area, $d_{in}^k$ represents for the internal diameter of the pipeline in the $k^{th}$ heating area, and $\rho_t^k$ represents for the hot water density in the $k^{th}$ heating area at period t; and (7) heat-exchange power of the heat-exchange station as shown as $$c_{water} \cdot m_t^k \cdot (\tau_t^{S,k} - \tau_t^{R,k}) = H_{t,k} \quad \forall t \in \Gamma, k \in K \quad (14)$$

$$\underline{\tau}^{R,k} \leq \tau_t^{R,k} \leq \overline{\tau}^{R,k} \quad \forall t \in \Gamma, k \in K \quad (15)$$

wherein $H_{t,k}$ is the heat-exchange power of the heat-exchange station, $\underline{\tau}^{R,k}$ is a lower limit of water return temperature of the $k^{th}$ heat-exchange station, and $\overline{\tau}^{R,k}$ is an upper limit of water return temperature of the $k^{th}$ heat-exchange station.

Step 3: a terminal heat consumer model capable of reflecting indoor temperature is established according to the heat load.

The heat transmission loss of the heat distribution network is omitted, and due to the neglection of the heat transmission loss of the heat distribution network, heat absorbed from the heat transmission network by the heat-exchange station is regarded as heat transmitted to the consumer side. Then, the heat loss of building envelopes, the cold air invasion heat loss and the cold air infiltration heat loss of buildings in the heating area can be calculated respectively. According to the related design formula of heat engineering, the average indoor temperature in one heating area can be obtained. It is used to measure the thermal comfort of residents. In this model, the average indoor temperature is a unique index for measuring the thermal comfort degree.

A residential building can also be regarded as a heat storage device with huge thermal inertia, heat can be stored in indoor air, doors and windows as well as furniture. The thermal inertia of the building can reduce peak value of heat demand and the variation rate of indoor temperature, and the peak staggered regulation of heat supply and power supply can be realized by utilizing the thermal inertia to promote wind power consumption.

(1) Heat Loss of the Building Envelope

The real heat transfer process is very complex and comprises convection, conduction and radiation. In order to simplify the heat transfer process, only the thermal loss calculation formula in steady state is used to solve the heat loss of building envelope.

$$Q_{t,k}^{BE} = A_k F_{e,k} (\theta_{t,k}^{in} - \theta_{t,k}^{out})(1 + x_k^g)(1 + x_k^{ch}) \quad \forall t \in \Gamma, k \in K \quad (16)$$

$$\theta_{min}^{in} \leq \theta_{t,k}^{in} \leq \theta_{max}^{in} \quad (17)$$

$$-\theta_{ch} \leq \theta_{t+1,k}^{in} - \theta_{t,k+1}^{in} \leq \theta_{ch} \quad (18)$$

wherein $Q_{t,k}^{BB}$ is the heat loss of the building envelope of the building, $x_k^g$ and $x_k^{ch}$ are respectively a correction coefficient of building height and a correction coefficient of building orientation in the $k^{th}$ heat load area, $A_k$ represents for the area of the building envelope of the building in the $k^{th}$ heat load area, $F_{e,k}$ represents for the heat transmission coefficient of the building envelope of the building in the $k^{th}$ heat load area, $\theta_{t,k}^{in}$ represents for the average indoor temperature in the $k^{th}$ heat load area at period t, $\theta_{t,k}^{out}$ represents for the outdoor temperature in the $k^{th}$ heat load area at period t, $\theta_{min}^{in}$ and $\theta_{max}^{in}$ respectively represent for minimum average indoor temperature and maximum average indoor temperature, $\theta_{ch}$ represents for the maximum change rate of the average indoor temperature within the unit dispatching time, $\Gamma$ represents for the set of the dispatching periods, and K represents for a set of the heating areas of the heat loads;

(2) Cold Air Infiltration Heat Loss

Cold air infiltrates into a room through gaps such as doors and windows under the action of indoor and outdoor pressure difference and the cold air escapes after being heated, and the heat consumed by heating cold air from the outdoor temperature to the indoor temperature becomes cold air infiltration heat loss:

$$Q_{t,k}^{Inf} = 0.278 \cdot \text{Num} \cdot V_k c_p \rho_t^{out} (\theta_{t,k}^{in} - \theta_{t,k}^{out}) \quad \forall t \in \Gamma, k \in K \quad (19)$$

wherein $Q_{t,k}^{Inf}$ is the cold air infiltration heat loss, Num represents for the air change rate per hour, $V_k$ represents for the total indoor volume in the $k^{th}$ heat load area, $c_p$ represents for constant-pressure specific heat capacity of cold air, and $\rho_t^{out}$ represents for outdoor air density at period t;

(3) Cold Air Invasion Heat Loss

The cold air invades into the room through opening external doors under the actions of air pressure and heat pressure in winter, and the heat consumed by heating the cold air to the indoor temperature is called as cold air invasion heat loss:

$$Q_{t,k}^{Ven} = 0.278 \cdot \text{Ven} \cdot c_p \rho_t^{out} (\theta_{t,k}^{in} - \theta_{t,k}^{out}) \quad \forall t \in \Gamma, k \in K \quad (20)$$

wherein $Q_{t,k}^{Ven}$ is the cold air invasion heat loss, and Ven represents for cold air invasion volume per hour;

(4) Calculation of Average Indoor Temperature Capable of Representing Thermal Inertia of Building In order to simplify calculation, an assumption is made as follows: the air temperature in the building is consistent and can be described by $\theta_{t,k}^{in}$; the thermal mass temperature distribution in the building is uniform, which means that the velocity of the surface heat diffusion process on the thermal mass is far larger than that of convection heat exchange; all heat obtained in the building within the unit time can be uniformly expressed by $H_t^k$ Based on the assumption, the calculation of the average indoor temperature can be expressed by the formula (21):

$$Q_{t,k}^{BE} + Q_{t,k}^{Inf} + Q_{t,k}^{Ven} + C_M M_k (\theta_{t+1,k}^{in} - \theta_{t,k}^{in}) / \Delta t = H_{t,k} \quad (21)$$

wherein $H_{t,k}$ is the average indoor temperature, $C_M$ represents for the specific heat capacity of the thermal mass, $M_k$ represents for the mass of the thermal mass in the $k^{th}$ heat load area, and the product of $C_M$ and $M_k$ can be obtained by an engineering experiment.

Step 4: a combined optimal dispatching model comprising conventional generators, wind power units, CHP units, electric boilers and heat storage tanks is established according to the heat source. The ultimate purpose of establishing the heating network model and the district heat consumer model is to consume wind power and reduce the combustion of the fossil fuel. Therefore, the combined optimal dispatching model comprising various power and heat supply devices is finally required to be established to check the effectiveness and practicability of the established heating network model and heat consumer model.

(1) CHP Unit Model $$0 \leq h_{i,t} \leq \overline{h}_i \quad \forall i \in I^{CHP}, t \in \Gamma \quad (22)$$

$$\begin{cases} p_{i,t} \leq \overline{p}_i - C_i^1 \cdot h_{i,t} \\ p_{i,t} \geq \max\{C_i^{max} \cdot h_{i,t} + C_i, \underline{p}_i - C_i^2 \cdot h_{i,t}\} \end{cases} \forall i \in I^{CHP}, t \in \Gamma \quad (23)$$

$p_{i,t}$ is generated output of the CHP units, $\overline{p}_i$ is an upper limit of the generated output of the CHP units, $\underline{p}_i$ is a lower limit of the generated output of the CHP units, $C_i^{max}$, $C_i^1$ and $C_i^2$ are heat and power coupling property factors of the CHP units, $h_{i,t}$ represents for heating power of the CHP units, $\overline{h}_i$ represents for the maximum heating power, and $I^{CHP}$ represents for a set of serial numbers of CHP units;

(2) Electric Boiler Model $$0 \leq BH_{u,t} \leq \overline{BH}_u \quad \forall u \in U, t \in \Gamma \quad (24)$$

$$BH_{u,t} = \eta \cdot BP_{u,t} \quad \forall u \in U, t \in \Gamma \quad (25)$$

$BH_{u,t}$ represents for the heating power of the electric boilers u at period t, $BP_{u,t}$ represents for electrical power consumed by the electric boilers, $\eta$ represents for the thermal efficiency of the electric boilers, $\overline{BH}_u$ represents for the maximum heating power of the electric boilers, U represents for a set of serial numbers of the electric boilers, and $\Gamma$ represents for a set of dispatching periods;

(3) Establishment of Heat Storage Tank Model According to Same Total Heat Charge/Discharge of Heat Storage Tank within One Day $$S_{w,t+1} = S_{w,t} + CS_{w,t} - DCS_{w,t} \quad \forall w \in W, t \in \Gamma \quad (26)$$

$$f_{w,t} \in \{0, 1\} \quad \forall w \in W, t \in \Gamma \quad (27)$$

$$0 \leq S_{w,t} \leq \overline{S}_w \quad \forall w \in W, t \in \Gamma \quad (28)$$

$$0 \leq CS_{w,t} \leq f_{w,t} \cdot \overline{CS}_w \quad \forall w \in W, t \in \Gamma \quad (29)$$

$$0 \leq DCS_{w,t} \leq (1 - f_{w,t}) \cdot \overline{DCS}_w \quad \forall w \in W, t \in \Gamma \quad (30)$$

$$\sum_{w \in W} \sum_{t \in \Gamma} CS_{w,t} = \sum_{w \in W} \sum_{t \in \Gamma} DCS_{w,t} \quad (31)$$

$S_{w,t}$ represents for the heat reserve capacity of the heat storage tank w at period t, $CS_{w,t}$ represents for the heat charging power of the heat storage tank w at period t, $DCS_{w,t}$ represents for the heat discharging power of the heat storage tank w at period t, $f_{w,t}$ represents for the state of the heat storage tank w at period t, 0 represents for heat discharging of the heat storage tanks, 1 represents for heat storage of the heat storage tanks, $\overline{S}_w$ represents for the maximum heat reserve capacity of the heat storage tank w, $\overline{CS}_w$ represents for the maximum heat storage power of the heat storage tank w, $\overline{DCS}_w$ represents for the maximum heat discharging power of the heat storage tank w, and W represents for a set of serial numbers of heat storage tanks; and the formula (31) shows that the total heat charge/discharge of the heat storage tanks within one day is the same;

(4) Electrical Power Balance $$\sum_{i \in I^{CG}} p_{i,t} + \sum_{i \in I^{CHP}} p_{i,t} + \sum_{i \in I^{WP}} p_{i,t} = \sum_{u \in U} BP_{u,t} + \sum_{n \in I^{Load}} LD_{n,t} \quad (32)$$

$$\forall t \in \Gamma$$

$I^{CG}$, $I^{WP}$ and $I^{Load}$ respectively represent for a serial number of the conventional generators, a serial number of wind farms and a serial number of electrical load nodes, and $LD_{n,t}$ represents for load power connecting to a bus n at period t;

(5) Heat Power Constraints $$\sum_{u \in U} BH_{u,t} + \sum_{i \in I^{CHP}} h_{i,t} \geq \quad (33)$$

$$\sum_{k \in K} Q_{t+k,k}^{Total} + \sum_{w \in W} f_{w,t} \cdot CS_{w,t} + (1 - f_{w,t}) \cdot DCS_{w,t}$$

$$Q_{t+k,k}^{Total} = Q_{t+k,k}^{BE} + Q_{t+k,k}^{Inf} + Q_{t+k,k}^{Ven} \quad \forall t \in \Gamma, k \in K \quad (34)$$

$Q_{t+k,k}^{Total}$ is the total heat consumption power of the building in the k heating areas at period t+k;

(6) Ramp Rate Constraints of Unit $$-rdown_i \cdot \Delta t \leq p_{i,1} - p_{i,t-1} \leq rup_i \cdot \Delta t$$

$$\forall i \in I^{CHP} \cup I^{CG}, t \in \Gamma \quad (35)$$

$rup_i$ and $rdown_i$ respectively represent for the maximum upward ramp rate and downward ramp rate of the unit, and $\Delta t$ is the dispatching time interval;

(7) Spinning Reserve Constraints of System $$\sum_{i \in I^{CG}} \min\{\overline{p}_i - p_{i,t}, \Delta t \cdot rup_i\} \geq SR^{up} \quad \forall t \in \Gamma \quad (36)$$

$$\sum_{i \in I^{CG}} \min\{p_{i,t} - \underline{p}_i, \Delta t \cdot rdown_i\} \geq SR^{down} \quad \forall t \in \Gamma \quad (37)$$

$SK_{up}$ and $SR^{down}$ represent for the upward spinning reserve rate and downward spinning reserve rate required by a system, respectively;

(8) System Load Flow Constraints $$\left| \sum_{n \in I^{bus}} SF_{l,n} \cdot \left( \sum_{i \in S_n^{CG} \cup S_n^{CHP}} p_{i,t} + \sum_{i \in S_n^{WP}} p_{i,t} - LD_{n,t} \right) \right| \leq F_l \quad (38)$$

$$\forall l \in I^{Line}, t \in \Gamma$$

wherein $SF_{l,n}$ represents for a transfer factor from the bus n to line l, $F_l$ represents for the maximum transmission capacity of the line l, $I^{Line}$ represents for the set of serial numbers of lines, $S_n^{CG}$ represents for the set of indices of conventional generators, $S_n^{CHP}$ represents for the set of indices of CHP cogeneration units, and $S_n^{WP}$ represents for the set of indices of wind generation units.

Figure 2:
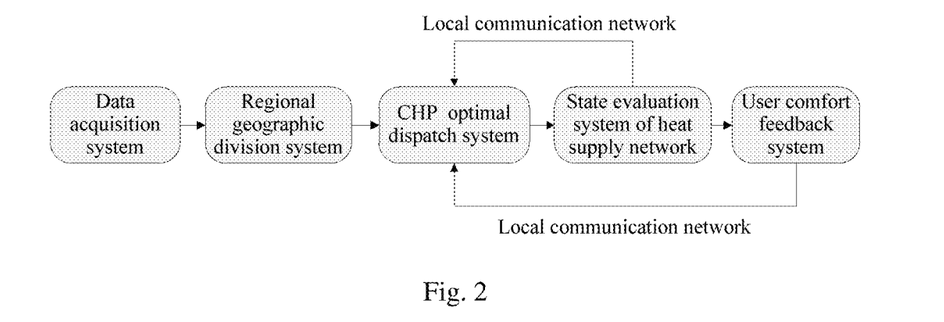
FIG. 2 is a detailed hardware implementation diagram of the present invention.

The diagram of detailed hardware implementation is as shown in FIG. 2. Basic parameters, such as the number of residents, heating area and ambient temperature, are collected by data acquisition system. Regional geographic division system divides sub-heating areas according to the distance between heat loads and heat sources. Based on latest state evaluation of heating supply network and the satisfaction data fed back from users, the CHP optimal dispatch system takes responsibility for optimizing the proposed model in this invention.

All parameters used in a modeling process can be obtained through the existing technology.

In conclusion, a CHP optimal dispatching model is established by jointly using a plurality of sub-models. It is a mixed integer programming model essentially.

Part of heating system in the embodiment adopts the DHS in a certain city in northeast area in China, and the power system partially extracts actually operating power grid data in this province in order to realize the coordination of the capacities of power and heat supply system. Table 1 shows information of all devices including a conventional generator 1, a conventional generator 2, a CHP unit 1 and a CHP unit 2. Table 2 shows all basic parameters used in this calculation example. The program is compiled on an Matlab R2014b platform by using Yalmip language, and the problem of mixed integer programming established by using the program is solved by Cplex solver.

TABLE 1

TYPES AND CAPACITIES OF DEVICES INVOLVED IN DISPATCHING

| Unit Type | Capacity | Unit Type | Capacity |
|---|---|---|---|
| CG1 | 2 × 350 MW | Electric boiler | 2 × 140 MW |
| CG2 | 3 × 350 MW | Heat storage tank | 1 × 1280 MW |
| CHP1 | 2 × 350 MW | Wind farm | 700 MW |
| CHP2 | 2 × 250 MW | | |

TABLE 2

TYPES AND CAPACITIES OF DEVICES INVOLVED IN DISPATCHING

| Parameters | Value | Parameters | Value |
|---|---|---|---|
| $\lambda_e$ | 2.4 W/m° C. | $x_k^g$ | 0.02 |
| $\alpha_r$ | 15 W/m²° C. | $x_k^{ch}$ | −0.15 |
| $d_{in}$ | 2 m | Num | 0.1/h |
| $d_{ex}$ | 2.114 m | Ven | 15 m²/h |
| $T_t^{surf}$ | −3° C. | $C_M$~$M_k$ | 1 GJ/° C. |
| $\lambda_b$ | 0.023 W/m° C. | $C_p$ | 1 KJ/kg° C. |
| $\beta$ | 0.1 | $\eta$ | 0.95 |
| $R_b$ | 0.384 m° C./W | $\theta_{min}^{in}$ | 20° C. |
| $R_e$ | 0.049 m° C./W | $\theta_{max}^{in}$ | 24° C. |
| $F_e$ | 0.44 W/m²° C. | $\theta_{ch}$ | 1° C. |

Embodiment 1

In the embodiment 1, system load flow constraints, the pressure loss of the heating pipe network and the heat storage tanks are not taken into consideration temporarily. The transmission time of hot water is far longer than that of electric power, and therefore, the farther distance between heat sources and heat load areas, the longer time delay it is necessary to be considered. In conventional optimal dispatching, the time delay of the heating network is not taken into consideration, and the output power of the heat source constantly follows the heat load, which makes the time period that the heat load reaches a peak value superposed with the time period that a power load reaches a peak value, and the device has to operate in the overload state to satisfy the demands of consumers, which is easy to cause system faults. In conventional optimal dispatching, heat load balance constraints are expressed by formulae (39)-(40):

$$\sum_{u \in U} BH_{u,t} + \sum_{i \in I^{CHP}} h_{i,t} = \sum_{k \in K} Q_{t,k}^{Total} \quad \forall t \in \Gamma \quad (39)$$

$$Q_{t,k}^{Total} = Q_{t,k}^{BE} + Q_{t,k}^{Inf} + Q_{t,k}^{Ven} \quad \forall t \in \Gamma, k \in K \quad (40)$$

Figure 3A:
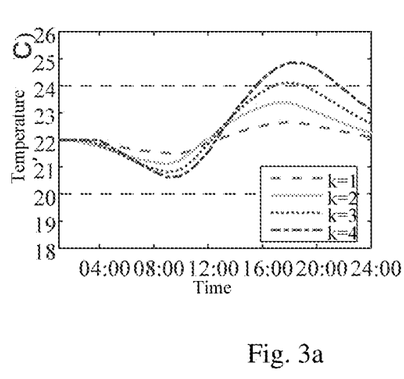
FIG. 3a is an average indoor temperature variation curve obtained by using conventional modeling method.
Figure 3B:
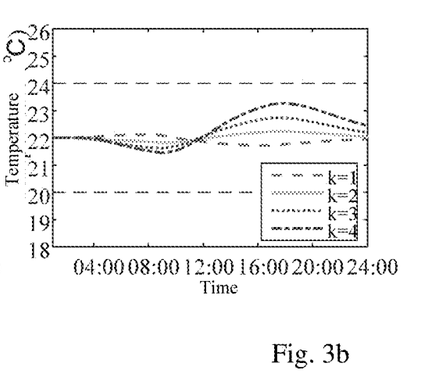
FIG. 3b is an average indoor temperature variation curve obtained by using the proposed method.
Figure 4A:
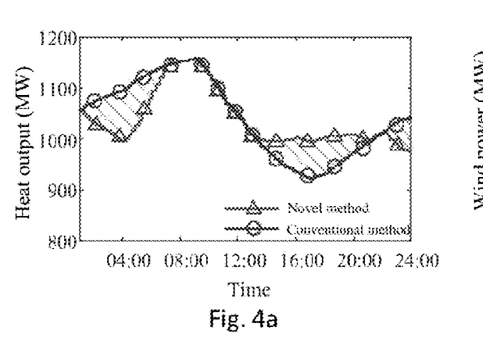
FIG. 4a is a comparison diagram of total heat output of heat sources.
Figure 4B:
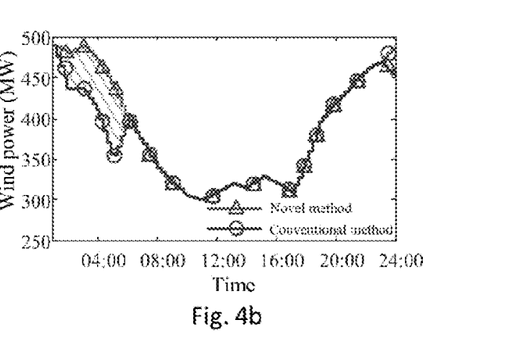
FIG. 4b is a comparison diagram of wind power accommodation.
Figure 4C:
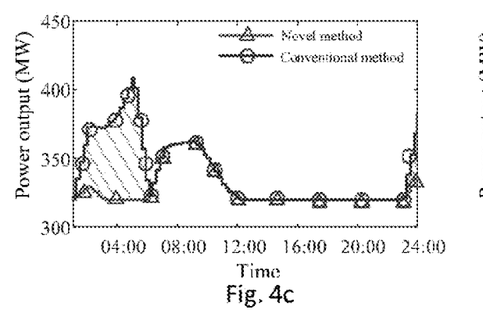
FIG. 4c is a comparison diagram of output of the CHP unit 2.
Figure 4D:
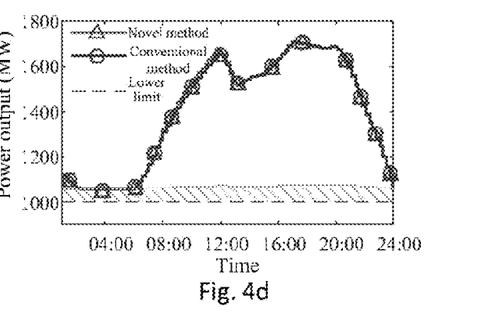
FIG. 4d is a comparison diagram of superposed generated output of the conventional generator 1 and the conventional generator 2.

In the embodiment, the heat load area is divided into four parts, FIG. 3 respectively shows the variations of the average indoor temperature obtained from the conventional model and the model proposed by the present invention, and the two horizontal dotted lines in the figure respectively represent for the upper limit of the temperature and the lower limit of the temperature. As we can see, the further the distance between the heat source and heat load areas, the larger temperature fluctuation the inhabitants will suffer. In some periods, the average indoor temperature of the fourth load area is larger than upper limit. Heat users may feel too hot to open their windows to decrease the indoor temperature which cause a great waste of resource. In the actual situation, the indoor temperature is also often lower than the minimum limit where the heat load areas are far away from the heat source. This is one of the reasons why the heat-supply companies often receive complaints during heating periods. Fortunately, in most cases, heat users can be satisfied thanks to the strong thermal inertia of buildings.

FIG. 4 shows optimal results obtained by using the conventional optimal dispatching model and the optimal model proposed by the present invention, a slash filling part in FIG. 4 (a) represents for heat output regulation of the heat source, the slash filling part in FIG. 4 (b) represents for multi-adsorptive wind power, the slash filling part in FIG. 4 (c) represents for power output regulation of the heat supply unit, and the slash filling part in FIG. 4 (d) represents for spinning reserve capacity of the power system. In these two methods, the electric boilers work at the maximum power. The optimal results show that the generation cost of the conventional optimal dispatching model is $149 120, and the cost of the proposed model is $142 470. Wind power absorbed by the optimal model proposed by the present invention can be increased by 270 MWh within one day due to the adoption of peak staggered regulation by which the CHP units operate more flexibly. In the model proposed by the present invention, the heat source does not urgently follows up the fluctuation of the heat load, and the variation range of indoor temperature is sufficiently utilized. Due to the variation, the heat and power outputs of the CHP units can be reduced, so that more space is vacated to absorb wind power.

Embodiment 2

Figure 5A:
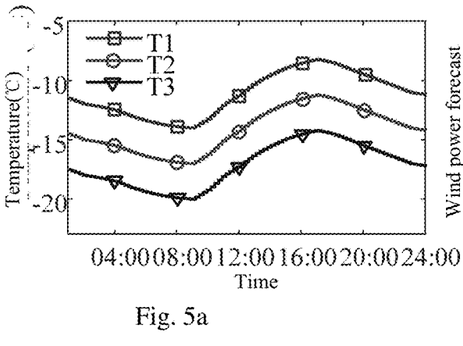
FIG. 5a shows three intraday environment temperature curves.
Figure 5B:
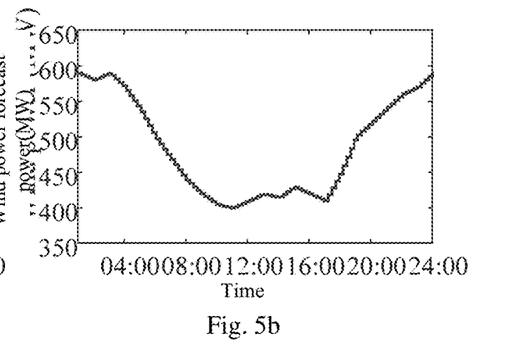
FIG. 5b is a wind power prediction curve when the temperature is respectively shown as FIG. 5 (a)

In the embodiment 2, a large heat storage tank is taken into consideration in the optimal dispatching model proposed by the present invention. The influences of relevant parameters of the heat storage tanks to wind power absorption are analyzed and shown in the embodiment. FIG. 5 shows indoor temperature variations and wind power forecast curves in three environments with different average temperatures.

Figure 6:
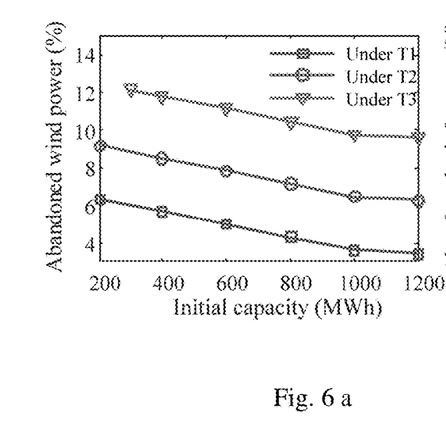
FIG. 6a shows influences of initial heat storage capacity of the heat storage tanks to wind power absorption.
FIG. 6b shows influences of heat charging/discharging rate to wind power absorption.
Figure 6B:
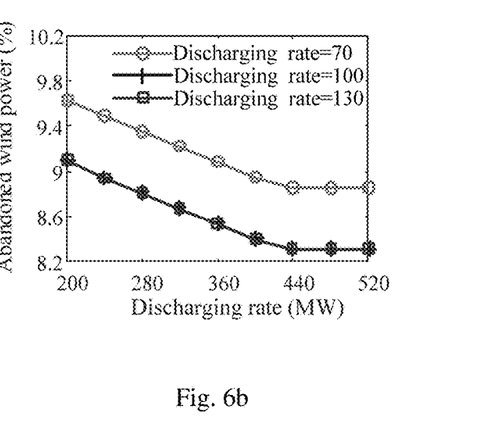

FIG. 6 shows the influences of the initial heat storage capacity as well as heat charging/discharging rate of the heat storage tanks to wind power absorption. Known from FIG. 6 (a), the initial heat storage capacity of the heat storage tanks can increase the wind power absorption rate.

However, when the temperature follows T3 and the initial capacity is less than 300 MWh, there is no feasible solution to this optimal problem. This is because the heat sources cannot meet the basic heat demand at the beginning of the simulation. Besides, when the initial capacity of the heat storage tank increases to 1100 MWh, the abandoned wind power cannot be cut down any more, this is because the heat reserve capacity is sufficient for schedule throughout the day, and it is no help to facilitate wind power utilization by increasing the heat storage capacity only.

Generally, the larger charging/discharging rate is supportive for cutting down the amount of abandoned wind power. However, in this project, when the charging rate larger than 100 MW and discharging rate larger than 450 MW, the charging/discharging rate will do not improve the wind power consumption any more due to the spinning reserve constraints. Hence, the parameters of the tank should be optimized based on the size of DHS and composition of all units. This example demonstrates that electric power dispatch and heat supply is still interdependence, though the strong linkage between heat and power is decoupled by heat storage tank.

What is claimed is:

1. A method for dispatching an optimal combined heat by a combined heat power (CHP) apparatus, characterized in that the CHP apparatus comprises a computer-readable device and an instruction; the CHP apparatus is used for controlling a district heating system (DHS) comprising a heat source, a heating network and a heat load, the heating network comprises a heat transmission network and a heat distribution network, and the CHP apparatus executes a processor for performing the following steps:

step 1: receiving, by the processor, a plurality of heating areas based on a distance from the heat load to the heat source, and a plurality of time periods based on different time in one day; collecting heat data from the heat source that comprises conventional generators, CHP unit, wind power units, -electric boilers and heat storage tanks;

step 2: collecting data of heat transmission loss from the heat distribution network, and establishing a heat transmission network module for creating transmission time delay of the heating network based on the heat transmission network; wherein the heat transmission loss comprises each heating area within each time period and establishing a confluence node module of the heat transmission network which is a steady state heat transmission of the heat transmission network;

wherein the heat transmission network module comprises:

(1) collecting an external diameter of a pipeline, a distance between center of the pipeline and soil surface, and a heat transfer coefficient of soil; generating, by the processor, a thermal resistance of soil and a temperature loss of hot water in the pipeline;

(2) measuring a mass flow of water in the pipeline, a water quality flow to an end heat exchange station and a mass flow out rate of water from the end heat exchange station; generating, by the processor, continuity constraints of mass flow rates of nodes considering time delay;

(3) measuring water supply temperature and water return temperature of a heat-exchange station in a period; generating, by the processor, a water temperature at a confluence node; (4) by the processor, receiving a maximum mass flow rate flowing through the heat-exchange station and maximum mass flow rate of a water supply pipeline, and generating a pipeline flow rate limitation;

(5) collecting pipeline parameters, water density, mass flow and pressure of each node of a heating pipeline; generating, by the processor, a pressure loss; and (6) by the processor, receiving heat-exchange power of the heat-exchange station and generating a heat-exchange power of the heat-exchange station;

step 3: creating a terminal heat consumer module that being capable of reflecting indoor temperature according to the heat load;

step 4: establishing the optimal CHP module that being capable of controlling heat generation from the heat source; and step 5: re-distributing heat from the heat source to the heat load.

2. The method according to claim 1, characterized in that establishing the terminal heat consumer module in the step 3 comprises: omitting the heat transmission loss of the heat distribution network, regarding heat absorbed from the heat transmission network by the heat-exchange station as heat transmitted to a consumer side, and receiving, by the processor, heat loss of a building envelope, cold air invasion heat loss and cold air infiltration heat loss of a building in the heating area based on a heat engineering to generate an average indoor temperature in one heating area so as to balance the thermal comfort degree of a consumer.

3. The method according to claim 2, characterized in that the average indoor temperature in the heating area comprises (1) by the processor, receiving building parameters and the temperature difference between indoor and outdoor, indoor temperature change rate of the building, the heat transmission coefficient and the area of and the heat loss of building envelope of the building, a correction coefficient of building height and a correction coefficient of building orientation, average indoor and outdoor temperature in the heat load area in a period and minimum average indoor temperature and maximum average indoor temperature, and generating a real heat transfer process;

(2) collecting data on cold air infiltrating into a room through gaps such as doors and windows under the action of an indoor and outdoor pressure difference caused by wind power and heat pressure and escapes after being heated, and the heat consumed by heating the part of cold air from the outdoor temperature to the indoor temperature, generating, by the processor, a cold air infiltration heat loss;

(3) collecting data on the cold air invades into the room through opening external doors under the actions of air pressure and heat pressure in winter, and the heat consumed by heating the part of cold air to the indoor temperature, and generating, by the processor, a cold air invasion heat loss; and (4) by the processor, receiving the heat loss of the building envelope, the infiltration heat loss and the ventilation heat loss, creating an average indoor temperature.

4. The method according to claim 1, characterized in that establishing the optimal CHP module in the step 4 comprises:

(1) CHP units;

(2) receiving heating power of a electric boiler, electrical power consumed by the electric boiler, thermal efficiency of the electric boiler and maximum heating power of the electric boiler, and generating, by the processor, electric boiler module;

(3) receiving heat reserve capacity of, heat charging power of, heat discharging power of the heat storage tanks a period, a state of the heat storage tanks, heat discharging of the heat storage tanks, heat storage of the heat storage tanks, maximum heat reserve capacity of the heat storage tanks, maximum heat storage power of the heat storage tanks and maximum heat discharging power of the heat storage, and creating, the processor, heat storage tank model;

(4) collecting data on conventional generators, electrical load nodes and load power connecting to a bus in a period, and creating, the processor, an electrical power balance;

(5) receiving total heat output of electric boiler, heat output of CHP unit, heat release of heat storage tank, heat consumption of the building, and creating, the processor, heat power constraints;

(6) receiving maximum upward ramp rate, downward ramp rate of the unit and dispatching time interval, and creating, the processor, ramp rate constraints of unit;

(7) inputting maximum upward spinning reserve constraint and downward spinning reserve constraint, and creating, the processor, spinning reserve constraints of system; and (8) inputting a transfer factor from the bus to a line, maximum transmission capacity of the line, indices of conventional generators, indices of CHP units, and indices of wind generation units, and creating, the processor, system load flow constraints.

\* \* \* \* \*